(12) United States Patent
Sauer

(10) Patent No.: US 6,240,136 B1
(45) Date of Patent: May 29, 2001

(54) METHOD OF PROVIDING AN ACCESS POINT INTO A VIDEO DATA STREAM AND APPARATUS FOR CARRYING OUT THE METHOD

(75) Inventor: Peter Sauer, Ditzingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/252,453

(22) Filed: Feb. 18, 1999

(30) Foreign Application Priority Data

Feb. 19, 1998 (DE) .............................................. 198 06 913

(51) Int. Cl.⁷ ...................................................... H04N 7/12
(52) U.S. Cl. ...................................................... 375/240.25
(58) Field of Search ........................ 375/240.25, 240.13, 375/240.26; 348/416.1, 425.1, 425.3; 386/68, 109, 111

(56) References Cited

U.S. PATENT DOCUMENTS

| | | | |
|---|---|---|---|
| 5,602,592 | 2/1997 | Mori et al. ........................ | 348/415.1 |
| 5,621,840 | * 4/1997 | Kawamura et al. .................... | 386/68 |
| 5,771,357 | * 6/1998 | Kato et al. ........................... | 709/247 |
| 6,009,229 | * 12/1999 | Kawamura ............................. | 386/68 |
| 6,141,491 | * 10/2000 | Yamagishi et al. ................... | 386/109 |
| 6,151,443 | * 11/2000 | Gable et al. .......................... | 386/109 |
| 6,167,083 | * 12/2000 | Sporer et al. .................... | 375/240.01 |

FOREIGN PATENT DOCUMENTS

| | | |
|---|---|---|
| 3613343 A1 | 10/1987 | (DE) . |
| 3831277 A1 | 3/1990 | (DE) . |
| 195 31 847 A1 | 3/1997 | (DE) . |
| 197 09 391 A1 | 10/1997 | (DE) . |
| 196 26 108 A1 | 1/1998 | (DE) . |
| 196 44 650 A1 | 4/1998 | (DE) . |
| 0 633 694 A1 | 1/1995 | (EP) . |
| 0 656 729 A2 | 6/1995 | (EP) ............................... H04N/7/58 |
| 0 695 088 A2 | 1/1996 | (EP) ............................... H04N/5/926 |
| 0 738 083 A2 | 10/1996 | (EP) . |
| 0 762 770 A2 | 3/1997 | (EP) ............................... H04N/7/26 |
| 410294953A | * 11/1998 | (JP) ............................... H04N/7/30 |

OTHER PUBLICATIONS

Talreja et al., "Editing techniques for MPEG multiplexed streams", IEEE International Conf. on Multimedia Computing and Systems, pp. 278–285.*
IBM Technical Disclosure, Exact Random Access of Motion Picture Expert Group Files, Dec. 1995.*
Brukeck et al., "Hierarchical storage management in a distributed VOD system", IEEE Multimedia, 1996, pp. 37–47.*

* cited by examiner

Primary Examiner—Vu Le
(74) Attorney, Agent, or Firm—Sughrue, Mion, Zinn, Macpeak & Seas, PLLC

(57) ABSTRACT

The apparatus according to the invention (VOR) for providing an access point into a stream of interframe-coded video data comprises: a first delay element ($\tau 1$) for delaying received intraframe- and interframe-coded video data by a fixed value; a decoder (D1) for decoding at least one intraframe-coded frame and interframe-coded frames; a buffer (MEMO) following the decoder (D1) for temporarily storing the decoded frames; an encoder (K2) following the buffer (MEMO) for encoding temporarily stored frames using intraframe coding; and a second delay element ($\tau 2$) following the encoder (K2) for delaying the interframe-coded frames, with the delay of the second delay element ($\tau 2$) being less than the delay of the first delay element ($\tau 1$).

7 Claims, 2 Drawing Sheets

METHOD OF PROVIDING AN ACCESS POINT INTO A VIDEO DATA STREAM AND APPARATUS FOR CARRYING OUT THE METHOD

BACKGROUND OF THE INVENTION

This invention relates to a method of providing an access point into a stream of interframe-coded video data, and to an apparatus for carrying out the method.

In service-on-demand systems, real-time video data are encoded in a server and movie video data are encoded and stored in a video server in order to be transmitted to a customer on demand. The real-time video data and the movie video data are organized in frames which, strung together, give, for example, a live broadcast transmission and a video, respectively.

Because of the limited transmission capacity of the transmission medium, e.g., a broadband cable, and particularly of the cables in the access network, a compression of the real-time/movie video data is performed in the server/video server by interframe coding. To accomplish this, instead of the original frames, only the differences of the data of successive frames are encoded. A disadvantage of the transmission of interframe-coded video data is that no access can take place in a continuous video data stream, since this would require knowledge of the preceding frame.

From DE 38 31 277 A1 it is known to insert, from time to time, intraframe-coded video data into the interframe-coded video data stream. Intraframe coding utilizes the correlation of the video data within a single frame. Thus, intraframe-coded frames can be used as access points, since no information on preceding frames is necessary for these points. The bit rate of intraframe-coded video data, however, is substantially higher than the bit rate of interframe-coded video data. A disadvantage of this method is therefore that increased transmission capacity is needed to transmit a video.

SUMMARY OF THE INVENTION

It is an object of the invention to provide a method of enabling access to a video data stream which is formed exclusively from interframe-coded video data except for the starting frame, and to an apparatus for carrying out this method.

This object is attained by a method as claimed in claim 1 and by an apparatus as claimed in claim 3.

BRIEF DESCRIPTION OF THE DRAWING

Two embodiments of the invention will now be explained with reference to the accompanying drawings, in which.

DETAILED DESCRIPTION OF THE INVENTION

Figure 1:
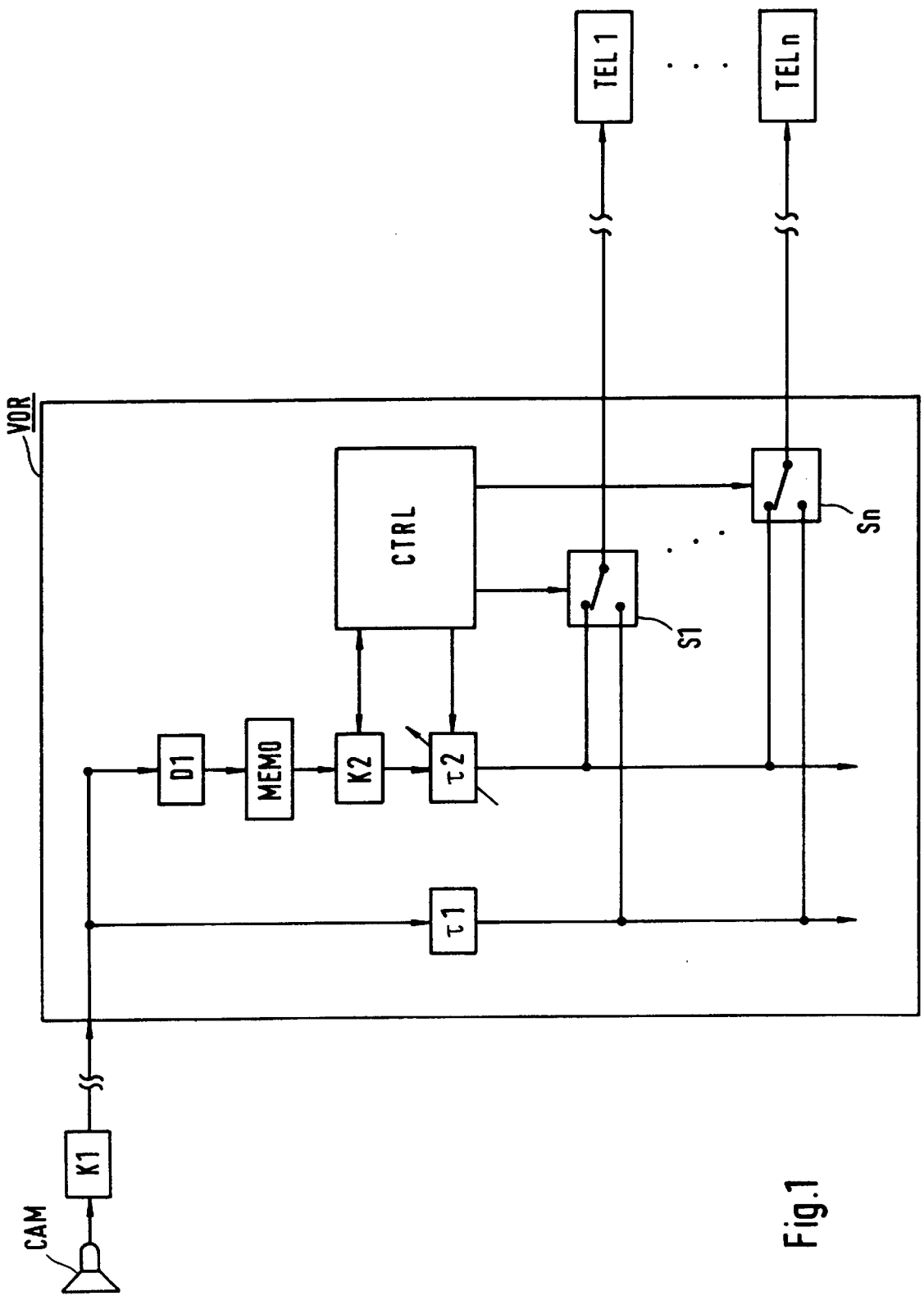
FIG. 1 is a schematic block diagram of a first apparatus according to the invention.
Figure 2:
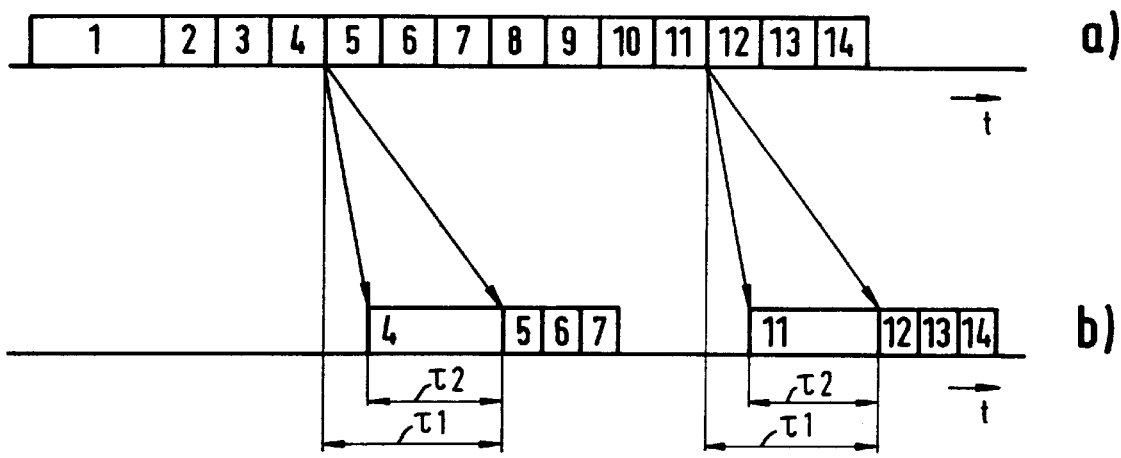
FIG. 2 shows two diagrams containing an interframe-coded data stream and two access points.

The first embodiment will now be explained with reference to FIGS. 1 and 2. FIG. 1 shows a first apparatus according to the invention, VOR, for providing one or more access points into a stream of interframe-coded video data.

The apparatus VOR serves in particular to receive real-time video data which come from a camera CAM and are encoded by an encoder K1, for example, and to route these data, at arbitrary instants to be determined by subscribers, to, e.g., a plurality of video telefones TEL1, . . . , TELn of the subscribers; n=a natural number, e.g. 20.

The camera CAM is scanning a scene to be broadcast live, for example, and feeds the video data to the encoder K1. In the encoder K1, the starting frame is encoded using intraframe coding, and all frames following the starting frame are encoded using interframe coding to minimize the necessary transmission capacity. Such an encoder is disclosed in DE 36 13 343, for example, where it is called a "hybrid encoder". The encoded video data are then fed to the apparatus VOR. The encoder K1 and the apparatus VOR may, for example, be housed in one case, e.g. at the server, or be interconnected via a transmission network, such as the ISDN or the B-ISDN, or via a radio link (ISDN=integrated services digital network, B-ISDN=broadband ISDN). The apparatus VOR and the video telephones TEL1 to TELn are interconnected via a transmission network, such as ISDN or B-ISDN, or via a radio link, for example.

The apparatus VOR contains a delay element $\tau 1$ for delaying intraframe- and interframe-coded video data received from the encoder K1 by a fixed value, e.g., a few milliseconds. The delay of the delay element $\tau 1$ is needed to provide access points for subscribers who wish to watch the live broadcast. The subscribers are offered the live broadcast delayed by the fixed value, which, however, is no disadvantage, since the delay is so small that it cannot be perceived by the human eye due to its persistence of vision.

The apparatus VOR further includes a series combination of a decoder D1, a buffer MEMO, an encoder K2, and a delay element $\tau 2$ for generating the access points.

The decoder D1 serves to decode at least one intraframe-coded frame, such as the starting frame of a live broadcast, and interframe-coded frames, such as frames following the starting frame in sequence. Because of the reception of the intraframe-coded starting frame, all further frames can be decoded even though they are interframe-coded, since all preceding frames are known.

In the buffer MEMO, for example a read/write memory, the decoded frames are temporarily stored.

Decoder D1 and buffer MEMO form parts of a video telephone, for example, which establishes a connection to the camera CAM and to the encoder K1.

The encoder K2 serves to encode temporarily stored frames using intraframe coding. The construction of the encoder K2 may correspond, in whole or in part, to that of the encoder K1. In the encoder K2, the access points are generated. The video data temporarily stored in the buffer MEMO are comparable to the video data presented to the camera CAM. The encoder K2 can thus generate intraframe-coded video data in the same manner as the encoder K1 without requiring information on preceding frames.

The delay element $\tau 2$ serves to delay the intraframe-coded frames generated in the encoder, with the delay of the delay element $\tau 2$ being less than the delay of the delay element $\tau 1$.

The apparatus VOR further includes a control unit CTRL, e.g. a microprocessor which also forms part of a video telephone, for example. The control unit CTRL is provided for controlling the encoder K2 and the delay element $\tau 2$.

The control unit CTRL is programmed to control the encoder K2 in such a way that the latter encodes a temporarily stored frame using intraframe coding at instants defined by the control unit CTRL. The encoder K2 is, for example, in an inactive state, in which it performs no encoding. In response to a control signal from the control unit CTRL, which was requested by a subscriber to access and transmit a live broadcast, the encoder K2 is changed to the active state, in which it encodes the last stored frame using intraframe coding. This intraframe-coded frame then serves as an access point for the transmission of the live broadcast to the subscriber. The transmission of the access point is followed, with a delay determined by the delay element τ2, by the transmission of the interframe-coded frames following the frame of the access point, so that a continuous data stream is obtained.

The delay of the delay element τ2 is adjusted by the control unit CTRL, which receives from the encoder K2 information on how much capacity is required for the intraframe-coded frame of the access point; from this capacity, the delay for the transmission of this frame can be calculated. The delay of the delay element τ2 is determined by the difference between the delay of the delay element τ1 and the delay required to generate the intraframe-coded frame of the access point. The transmission of the intraframe-coded frame of the access point and the transmission of the interframe-coded frames following the intraframe-coded frame of the access point in sequence are thus adapted to each other in time to produce the continuous data stream.

The apparatus VOR further includes at least one switch S1, Sn controllable by the control unit CTRL. Their number n (=a natural number) is adapted to the number of subscribers to be served, for example 64 switches for 1000 subscribers to permit 64 simultaneous transmissions. Each switch S1, Sn has two inputs and one output. One input of each switch S1, Sn is connected to the output of the delay element τ1, and the other to the output of the delay element τ2. Each switch S1, Sn is controllable by the control unit CTRL in such a way that, when a request of a subscriber to transmit, e.g., a live broadcast was received and an access point was generated, a continuous video data stream is provided at its output. Switch S1, for example, is permanently connected to delay element τ2. When a request of a subscriber to generate an access point and transmit a live broadcast is received, this access point will be generated and transmitted by the encoder K2 under control of the control unit CTRL. The access point passes through the delay element τ2 to the switch S1, which routes it to the subscriber. After transmission of the access point, the switch S1 is connected to the delay element τ1, so that the transmission of the access point is followed by the transmission of the frames following the access point. On completion of the transmission, the switch S1 is reconnected to the delay element τ2.

The method of providing an access point into a stream of interframe-coded video data comprises the following steps:

(a) receiving intraframe-coded video data of a starting frame, and temporarily storing the starting frame;

(b) receiving interframe-coded video data of frames following the starting frame in sequence, and temporarily storing the respective last received frame;

(c) receiving a request to generate an access point;

(d) encoding the next frame to be stored using intraframe coding, and simultaneously delaying all frames following the next frame to be stored by a predetermined value; and (e) delaying the intraframe-coded frame such that after transmission of the intraframe-coded frame, the transmission of the interframe-coded frame following the intraframe-coded frame can take place in a temporally adapted manner.

If more than one access point is to be provided, only steps (c) to (e) need to be carried out for each further access point. Steps (a) and (b) are carried out only once for each live broadcast, with step (b) being carried out concurrently with steps (c) to (e), which can be performed several times in succession. If two subscribers request a transmission simultaneously, steps (c) to (e) need to be carried out only once. Via two of the switches S1 to Sn, a simultaneous assignment of the continuous video data stream over two separate transmission lines to two independent subscribers can be effected.

FIG. 2a shows a diagram with 14 frames of a continuous video data stream. Frame 1 is the starting frame, which is encoded using intraframe coding. Frames 2 to 14 are encoded using interframe coding. For each of frames 2 to 14, less transmission capacity is needed than for frame 1. The t-axis measures the transmission time.

Figure 3:
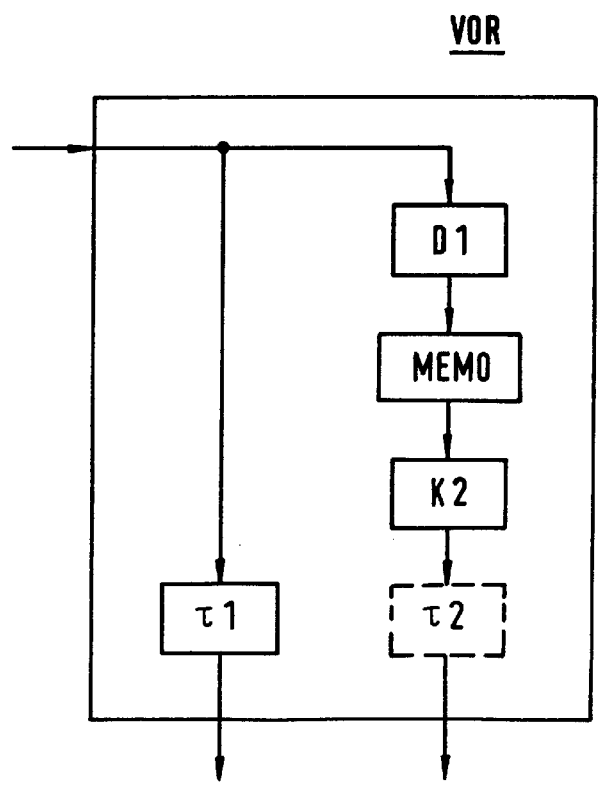
FIG. 3 is a schematic block diagram of a second apparatus according to the invention.

FIG. 2b shows two access points into the video data stream of FIG. 2a. After being decoded by the decoder D1 and temporarily stored in the buffer MEMO, the interframe-coded frame 4 is converted by the encoder K2 into an intraframe-coded frame which serves as an access point. The delay of the delay element τ2 is chosen so that the transmission of frame 5, delayed by a time interval equal to the delay of the delay element τ1, follows the transmission of the intraframe-coded frame 4 without interruption, so that a continuous video data stream is formed. In response to a further request from a subscriber, the interframe-coded frame 11 is converted to an intraframe-coded frame 11 which serves as a further access point. The delay of the delay element τ2 is chosen so that the transmission of frame 12, delayed by a time interval equal to the delay of the delay element τ1, follows the transmission of the intraframe-coded frame 11 without interruption. The second embodiment will now be explained with the aid of FIG. 3. FIG. 3 shows a second apparatus according to the invention, VOR, for generating two or more access points into a stream of interframe-coded video data. The apparatus VOR contains a delay element τ1 and a series combination of a decoder D1, a buffer MEMO, an encoder K2, and a delay element τ2. These units are identical in construction and operation to the corresponding units of FIG. 1 except for the fact that the encoder K2 and the delay element τ2 are controlled not by a control unit CTRL, but encode, at predefined instants, e.g. at equidistant time intervals, a temporarily stored frame using intraframe coding and transmit this frame adapted to the delay of the delay element τ1. The intraframe-coded frames serve as possible access points. They are transmitted concurrently with the continuous video data stream, for example over two separate transmission channels of the ISDN or over a single channel using time-division multiplexing. The receiver can then access the continuous video data stream at the possible access points. Instead of an adapted transmission of possible access points and the continuous video data stream, it is also possible to dispense with the delay element τ2. Steps must be taken in the receiver to ensure that an adapted access into the video data stream takes place. This is advantageous for transmission links, for example, where delay differences cannot be excluded for data transmitted over, e.g., two separate channels of the ISDN, so that the adaptation of the possible access points into the continuous video data stream could be changed during transmission in an unforeseeable manner.

In both embodiments, additional modules, such as signaling units for the establishment and release of connections, amplifiers, and echo cancellers, were not described for the sake of simplicity. The selection and the arrangement of these modules are obvious to the person skilled in the art.

What is claimed is:

1. A method of providing an access point into a stream of interframe-coded video data, comprising the steps of:
   (a) receiving intraframe-coded video data of a starting frame, and decoding and temporarily storing the starting frame;
   (b) receiving interframe-coded video data of frames following the starting frame in sequence, and decoding and temporarily storing the respective last received frame;
   (c) receiving a request to generate an access point;
   (d) encoding the next frame to be temporarily stored using intraframe coding, and simultaneously delaying all frames following the next frame to be temporarily stored by a predetermined value; and
   (e) delaying the intraframe-coded frame such that after transmission of the intraframe-coded frame, the transmission of the interframe-coded frame following the intraframe-coded frame can take place in a temporally adapted manner.

2. A method of providing access points into a stream of interframe-coded video data comprising steps (a) to
   (e) as claimed in claim 1, characterized in that for each further access point, steps (c) to (e) are carried out.

3. An apparatus (VOR) for carrying out the method claimed in claim 1, comprising: a first delay element ($\tau 1$) for delaying received intraframe- and interframe-coded video data by a fixed value, a decoder (D1) for decoding at least one intraframe-coded frame and interframe-coded frames; a buffer (MEMO) following the decoder (D1) for temporarily storing the decoded frames; an encoder (K2) following the buffer (MEMO) for encoding at least one temporarily stored frame using intraframe coding; and a second delay element ($\tau 2$) following the encoder (K2) for delaying the at least one interframe-coded frame, with the delay of the second delay element ($\tau 2$) being less than the delay of the first delay element ($\tau 1$).

4. An apparatus (VOR) as claimed in claim 3, characterized in that there is provided a control unit (CTRL) which is adapted to control the encoder (K2) in such a way that the encoder (K2) encodes a temporarily stored frame using intraframe coding at an instant defined by the control unit (CTRL).

5. An apparatus (VOR) as claimed in claim 4, characterized in that the control unit (CTRL) is adapted to adjust the delay of the second delay element ($\tau 2$) so as to temporally adapt the transmission of the intraframe-coded frame and the transmission of the interframe-coded frame following the intraframe-coded frame to one another.

6. An apparatus (VOR) as claimed in claim 5, characterized in that at least one switch (S1, Sn) controllable by the control unit (CTRL) is provided, that each switch (S1, Sn) has two inputs and one output, that one input of each switch (S1, Sn) is connected to the output of the first delay element ($\tau 1$) and the other input is connected to the output of the second delay element ($\tau 2$), and that each switch (S1, Sn) is controllable in such a way that a continuous video data stream is provided at its output.

7. An apparatus (VOR) as claimed in claim 3, characterized in that the encoder (K2) is adapted to encode a temporarily stored frame at predefined instants using intraframe coding.

\* \* \* \* \*